United States Patent [19]

Davis, Jr. et al.

[11] 4,429,515

[45] Feb. 7, 1984

[54] SELF PROPELLED LAWN MOWER

[76] Inventors: Robert D. Davis, Jr., 627 Andrew, Jackson, Mich. 49202; James S. Schucker, 54 Massoit, Clawson, Mich. 48017

[21] Appl. No.: 329,769

[22] Filed: Dec. 11, 1981

Related U.S. Application Data

[63] Continuation-in-part of Ser. No. 229,200, Jan. 28, 1981.

[51] Int. Cl.³ .................................... A01D 35/26
[52] U.S. Cl. .............................. 56/6; 56/13.6; 56/15.8; 56/16.2; 56/DIG. 22
[58] Field of Search ............... 56/6, 13.6, 15.8, 228, 56/15.9, 16.2, DIG. 22

[56] References Cited

U.S. PATENT DOCUMENTS 3,500,619  3/1970  Bacon ............................. 56/6
3,802,172  4/1974  Mathews ......................... 56/15.8
3,834,142  9/1974  Johnston et al. ............... 56/15.8

Primary Examiner—Jay N. Eskovitz
Attorney, Agent, or Firm—James M. Deimen

[57] ABSTRACT

The invention comprises an improved lawn mowing machine with a forward mounted mower deck including a plurality of rotary cutters. The blades or cutters rotate in opposite direction on opposite sides of the deck to bring the grass clippings to a deck mounted central vacuum. The mower blades are driven by a belt drive to eliminate expensive drive shafts and gearboxes. Applicant's 45° twist belt drive geometry provides increased life to the belt over prior art 90° twist belt drive geometries.

The mower deck includes novel side mower wings. A combined clutch and brake mechanism disengages the drive belt to the wing blade spindle and simultaneously brings the blade to a stop within one second when the wing is raised beyond its cutting range. The wing deck is attached to the mower central deck by a depressed hinge substantially close to the elevation of the mower blades. As the mower encounters uneven ground the separation of blade cutting paths is minimized in the movement of the wing blades relative to the central mower deck blades.

14 Claims, 19 Drawing Figures

SELF PROPELLED LAWN MOWER

BACKGROUND OF THE INVENTION

This application is a continuation-in-part of application Serial No. 229,200, filed Jan. 28, 1981 pending.

The field of the invention pertains to large self propelled lawn mowers and in particular to mowers with front mounted mower decks having a plurality of rotary cutting blades.

Through the years a variety of machines for lawn mowing large expanses of grass evenly and smoothly have been developed. U.S. Pat. Nos. 2,952,961 and 3,116,583 disclose tractor towed mowers for large expanses. U.S. Pat. No. 2,682,740 discloses a self propelled mower for large expanses. Concomitant with the need to mow large expanses economically is the need for good maneuverability and accuracy when trimming about trees, shrubs, gardens and structures. Gangs of mowers towed by a tractor are effective for the former, however, hand or small powered mowers are required for the latter when gang mowers are used. Examples of small self propelled mowers are disclosed in U.S. Pat. Nos. 2,193,712 and 3,152,431. As a result self propelled riding mowers with a central or front mounted deck have been developed. Central or front mounted decks are disclosed in U.S. Pat. Nos. 2,114,096 and 2,134,115, both of which also disclose belt driven multiple blade spindles. These mowers also disclose rotating and counterrotating blades.

To cut a swath substantially wider than the tractor on large expanses and accommodate uneven terrain the mower deck may be divided into hinged sections or wings. U.S. Pat. Nos. 2,952,961 and 3,116,583 illustrate winged sections each having an individual spindle and blade. Although shown here on tractor towed mower decks, such hinged wings are also used on front mounted mower decks.

SUMMARY OF THE INVENTION

The invention comprises an improved hydraulically driven mowing machine for large expanses of grass around apartment complexes, commercial facilities and golf courses. The mower is self propelled with a forward mounted mower deck including a plurality of rotary blades. The blades rotate in opposite directions on opposite sides of the deck to bring the grass clippings to a deck mounted central vacuum. The mower blades are driven by a belt drive to eliminate expensive drive shafts and gearboxes. Applicant's 45° twist belt drive geometry provides increased life to the belt over prior art 90° twist belt drive geometries.

The mower deck side wings at each end of the deck include several novel features. Firstly, a combined clutch and brake mechanism disengages the drive belt to the wing blade spindle and simultaneously brings the blade to a quick stop when the wing is raised beyond its cutting range. The wings may be disengaged without affecting the operation of the central deck mower blades.

The wing deck is attached to the central deck by a depressed hinge substantially close to the elevation of the mower blades. As the mower encounters uneven terrain, the separation of blade cutting paths between the wing blade and the adjacent central blade is substantially prevented despite the movement of the wing relative to the central deck. The depressed hinge also minimizes mower width over conventional hinge means when the wings are in the raised (vertical) position.

In an alternative embodiment each wing deck is attached to the central deck by fore and aft dual pinned links. The pinned linkage permits the hinge point of the wing deck to be at the same elevation as the wing deck mower blade. In addition, the pinned link connection permits the wing decks to be raised above the central deck and folded more tightly against the tractor portion of the mower.

The mower deck is equipped with front mounted casters which include a simple adjustment for blade height. The mower blade spindles include a simplified and effective means of retaining tapered roller bearings and include spacers on the spindle shaft for additional blade height adjustment.

In addition to the clutch and brake safety features of the mower deck wings, the safety of the mower is further enhanced by electric clutches which automatically disengage the mower deck drive belt and the hydraulic vehicle wheel drive if the machine operator leaves the seat of the vehicle. The machine steering, braking, forward and reverse speed are controlled by dual levers. To further enhance the operator control of the machine, twin damping means are connected to the control levers resulting in superior control of the machine when passing over rough terrain.

The overall length of the mower is less than the width of the mower with the wings down. With one drive wheel moving forward and the other backward at the same speed, the mower will spin about a vertical axis located approximately where the driver is seated. The circle swept out by the rear of the mower is smaller than that swept out by the mower deck. This feature provides superior maneuverability for cutting about trees, structures and other landscape features. The blades are rotated and located so as to bring the grass clippings adjacent the center blade of the deck. Slightly offset and behind the center blade is a vacuum fan chamber to vacuum up and blow the clippings into a bag mounted behind the driver.

The deck mounted vacuum fan mulches grass clippings and leaves before they are blown through a tube or hose to the bag. The hose passes under the operator thereby eliminating visibility, ingress and egress problems that arise with the side mounted vacuum systems of some prior art mowers. The center mounted vacuum fan also allows close trimming on both sides of the mower. The blades rotate to bring grass clippings to the center mounted vacuum thereby tending to throw objects encountered by the blades inwardly under the machine, an important safety feature. When the vacuum fan is not utilized, the rotational pattern of the blades disperses the grass evenly under the machine.

DESCRIPTION OF THE PREFERRED EMBODIMENTS

In FIGS. 1, 2, 3 and 4 the mower comprises a tractor portion generally denoted by 20 and mower deck generally denoted by 22. The tractor 20 is supported on two drive wheels 24 and a rear mounted dual wheel caster 28 that is free to swivel about a vertical axis at the rear of the tractor. Each of the drive wheels 24 are independently powered by hydraulic motors 30 and 32. Twin hydraulic pumps 26 are driven by an air cooled gasoline engine 34 through an electric clutch to supply hydraulic fluid to the hydraulic motors 30 and 32. The operator of the tractor sits on a seat 36 above the engine 34 and steers by moving levers 38 and 40 to control the flow of fluid to the motors 30 and 32. The levers 38 and 40 also control the forward and reverse speed of the tractor 20.

Figure 2:
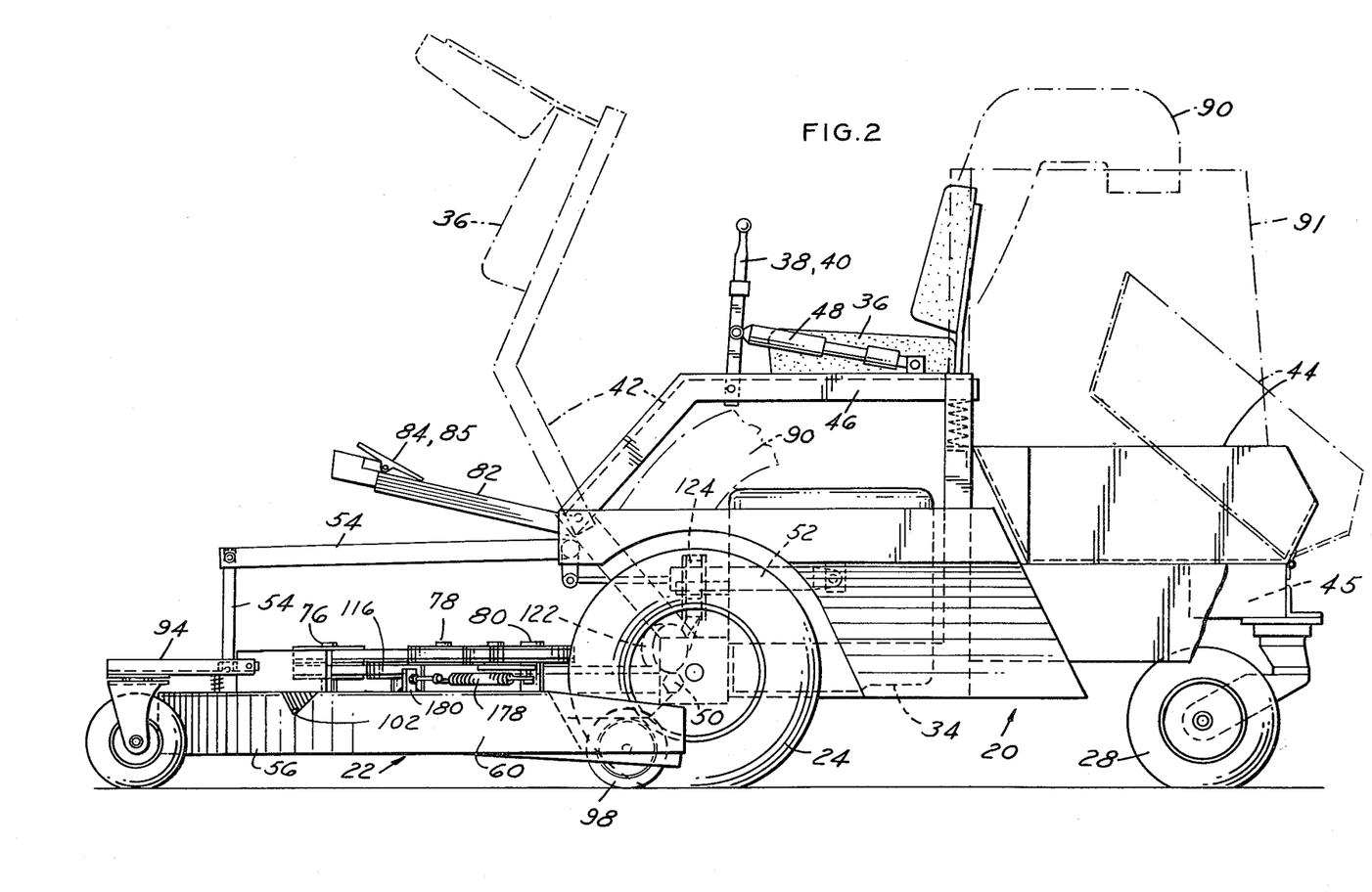
FIG. 2 is a side view of the mower.

As shown ghosted in FIG. 2 the seat 36 and seat frame 42 may be raised to provide access to the engine 34 thereunder. At the back of the tractor is a hopper 44 for grass clipping bag support or miscellaneous cargo. The hopper 44 as shown ghosted may be tilted to empty and to provide access to the pumps 26 and tool box 45.

Attached between each lever 38 or 40 and side frame 46 is a damper or shock absorber 48 to stabilize the movement of the levers as the tractor passes over rough terrain. The dampers 48 substantially decrease unwanted jarring movements of the levers 38 and 40 thereby providing smoother control of the tractor and mower deck. The dampers retard sudden reversal of the levers to reduce bucking of the machine and damage to the hydraulic equipment.

Figure 1:
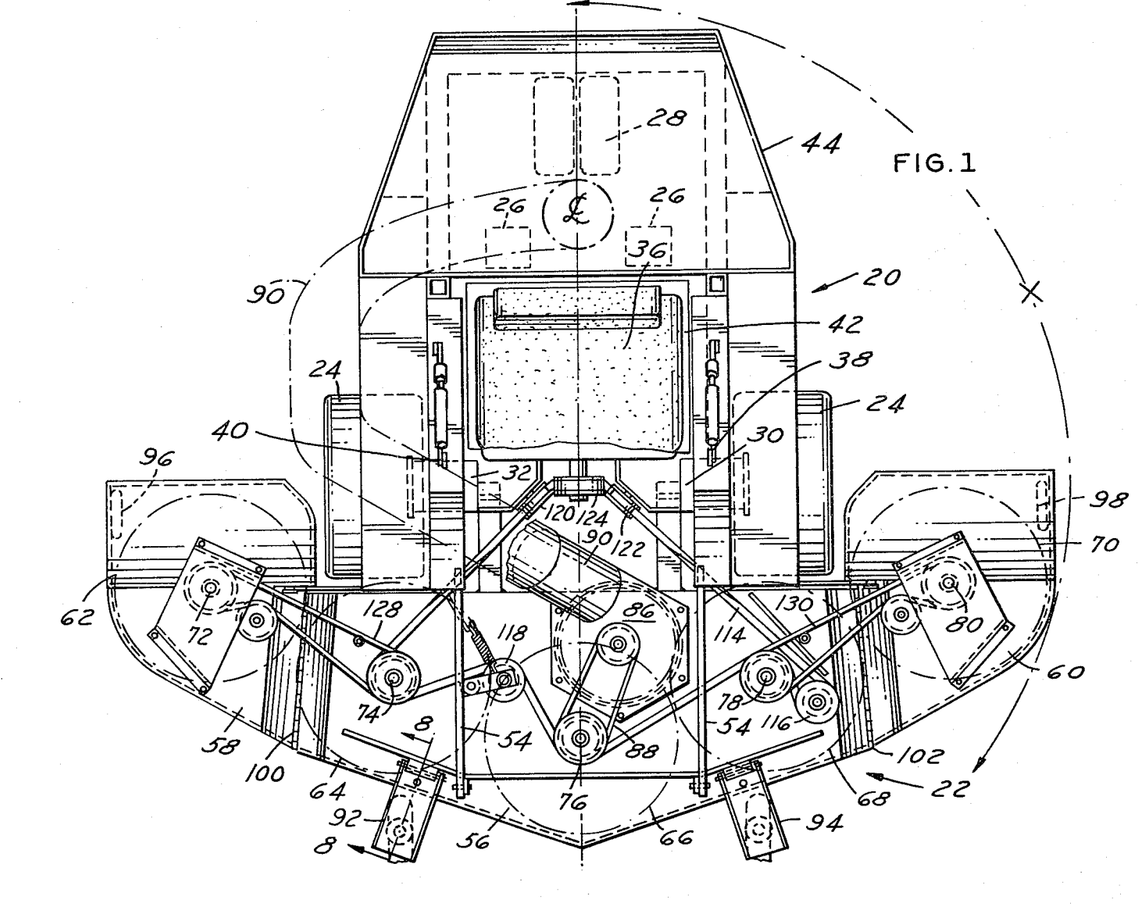
FIG. 1 is a partially broken away top view of the mower.

The mower deck 22 is pinned to the tractor at 50 and raised and lowered by the hydraulic cylinder 52 actuated linkage 54. The mower deck is divided into a center section 56 and side wings 58 and 60. Five rotary cutters or blades 62, 64, 66, 68 and 70 shown ghosted are suspended below the deck on spindles 72, 74, 76, 78 and 80. The mower deck is shown with the protective belt covers removed to illustrate the belt arrangement. In FIG. 1 the forward portion of the seat frame 42, foot rest 82, and foot pedals 84 and 85 are also not shown. The foot pedals 84 and 85 actuate respectively the hydraulic cylinder 52 to raise the deck 22 and cylinder 160 to raise the wings 58 and 60.

Rotary cutters 62, 64 and 66 rotate counterclockwise from above in FIG. 1 and rotary cutters 68 and 70 rotate clockwise thereby bringing the grass clippings between cutters 66 and 68. A blower or fan 86 is mounted in a chamber in the central section 56 behind spindle 76 and driven by an auxiliary belt 88 to vacuum up the grass clippings and discharge them through a flexible hose 90 shown ghosted in FIG. 1. The hose leads to a bag 91 shown ghosted in FIG. 2 in the hopper 44.

The center location on the vacuum fan 86 in substantially the center of the central section 56 of the deck 22 provides several advantages in operation of the machine. The fan mulches leaves and grass before their passage through the tube 90 reducing the possibility of clogging in the tube. The central vacuum location permits the machine to trim grass close to obstacles on either side of the machine. Vacuum attachments on prior art machines are located on one wing and interfere with close trimming. The hose 90 exits from under the seat frame 42 as shown best in FIG. 3 preventing interference with the visibility of the operator or his entry or exit to or from the machine. The counterrotational pattern of the blades also throws debri and objects to the center of the machine improving the safety aspect of the machine relative to bystanders and disperses grass clippings more evenly by releasing clippings out of both sides of the mower deck when the fan 86 is not in operation.

As can be seen clearly from FIG. 1 the overall length of the machine is less than the width of the machine with the wings 58 and 60 in mowing position. By reversing one drive wheel at the same speed as the other drive wheel moves forward, the machine will pivot about a vertical axis through the midpoint of a horizontal line joining the rotational axes of the drive wheels. Pivoting the machine about the vertical axis sweeps out a cutting path defined by the trimming edge of the wing as illustrated by the arrow X. Thus, the machine can turn within the cutting path of the wing decks. The shortened design of the machine allows for superior maneuverability compared to conventional zero turn radius mowers.

Figure 8:
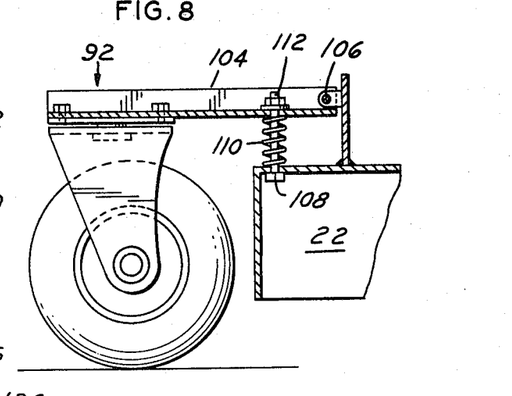
FIG. 8 is a side view detail of a mower deck caster.

In the lowered position the forward part of the mower deck 22 is supported by a pair of casters 92 and 94. The wings 58 and 60 are further supported by small wheels 96 and 98 and the depressed hinges 100 and 102. The casters 92 and 94 are shown in detail in FIG. 8 wherein an adjustment as follows is provided to set the cutting height of the mower deck. The caster frame 104 is pinned at 106 to the front of the mower deck 22. A bolt 108 and nut 112 joining the caster frame 104 and the deck 22 prevents the frame from rotating upwardly about the pin 106 when the mower deck 22 rests on the caster. Adjusting the nut downwardly rotates the caster assembly around pin 106 thereby raising the deck 22 relative to the ground in a simple and convenient manner. A spring 110 surrounding the bolt urges the frame 104 against nut 112 when the deck is raised and the caster wheel unloaded. This mounting for the caster will absorb the force of a frontal blow on the caster by permitting the caster frame 104 to rotate around pin 106 and compress spring 110. The mounting protects the caster assembly from damage if the machine accidently strikes a vertical curb or other object.

Figure 5:
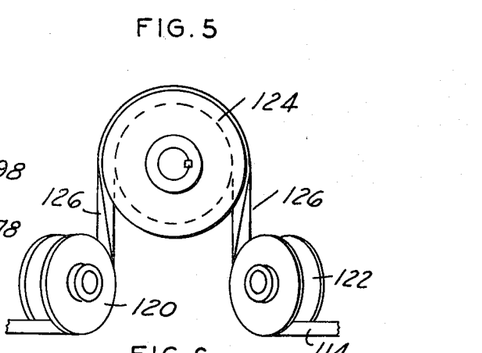
FIG. 5 is a front view detail of the main belt drive.
Figure 6:
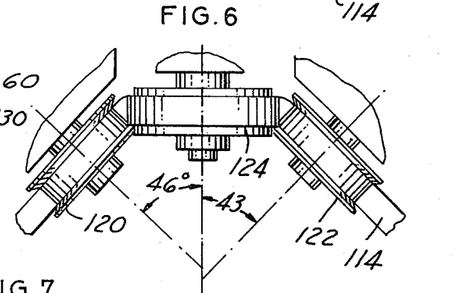
FIG. 6 is a top view of the belt drive detail of FIG. 5.

The three center blade spindles 74, 76 and 78 are driven by a v-ribbed belt 114 such as a "POLY-V" belt manufactured by the Goodyear Tire and Rubber Company. A non-adjustable idler pulley 116 contacting the back of the belt provides for clockwise rotation of spindle 78 as best shown in FIG. 1. An adjustable idler 118 controls belt tension. As detailed in FIGS. 5 and 6 the v-ribbed belt 114 passes under idler pulleys 120 and 122 before passing over main drive pulley 124. Main drive pulley 124 is connected through an electric clutch to the drive shaft of the tractor engine 34. As best shown in FIG. 6 the rotational axes of pulleys 120 and 122 are at approximately 45° from the rotational axis of main drive pulley 124. This "45°" belt twist drive provides superior belt life over the conventional "90°" twist belt drives sometimes used on other machines. The "45°" drive reduces the fatiguing of the belt due to twisting at 126 between the idler pulleys and the main drive pulley. The width of the v-ribbed belt effectively eliminates rolling of the belt common among "90°" twist configurations. The "45°" drive also allows room for the vacuum chamber and fan located in approximately the center of the mower deck. The specific angles 46° and 43° shown in FIG. 6 more accurately align the pulleys 120 and 122 with the peripheries of the spindle 74 pulley and the idler pulley 116 respectively. The wing spindles 72 and 80 are driven by auxiliary belts 128 and 130 from spindle 74 and spindle 78 pulleys respectively.

The two electric clutches on the engine 34, one for the tractor drive train and the other for the mower deck drive train, provide both a safety feature and a convenience feature. Both clutches are disengaged instantly if the operate leaves the seat 36. A manual switch control allows the operator to disengage the mower drive without disengaging the tractor drive. The disengagement of the tractor drive electric clutch allows the engine 34 to be started without any load from the hydraulic pumps, a feature not found on other hydraulic drive mowers and a feature especially beneficial in cold weather with resulting high hydraulic fluid viscosity.

Figure 9:
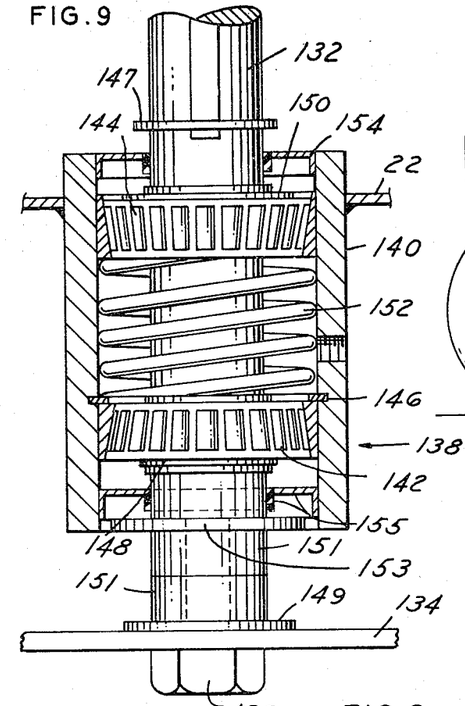
FIG. 9 is a detail of a blade spindle bearing.

A detail of the cutting blade spindles is shown in FIG. 9. The spindle shaft 132 has a blade 134 attached at the lower end by a bolt 136. The spindle shaft and blade are supported by a bearing assembly generally denoted by 138 having an outer cylindrical shell 140 mounted in the mower deck 22. Inside the assembly are a pair of opposed tapered roller bearings 142 and 144. A shell retaining snap ring 146 retains the outer race of bearing 142 and a shaft mounted snap ring 148 retains the inner race of bearing 142. A second shaft mounted snap ring 150 retains the inner race of bearing 144. The internal spring 152 urges the outer race of bearing 144 upwardly in turn urging the spindle shaft upwardly and thereby taking up any slack and wear in the bearing assembly. Upper and lower seals 154 and 155 are provided to protect the bearing assembly.

The lower seal 155 is reversed in position to permit the insertion of a protective washer 153 seated on the lower end of the shaft 132. The protective washer prevents string and grass from winding up against the seal 155. Below the washer 153 are spacer rings 151 and a blade washer 149 also mounted on the bolt 136. The spacer rings are inserted or deleted as required to determine the height of the blade 134 relative to the mower deck 22. Above the spindle bearing a snap ring 147 is positioned in a groove in the shaft 132 to support the drive pulley (not shown). Spindle bearings in commercial mower decks are a particular source of problems due to high rotational speeds for long periods of time under continuous adverse conditions of moisture, dirt and sudden shock loading. The spindle bearing assembly disclosed above provides an economical means of providing superior spindle bearings.

Figure 3:
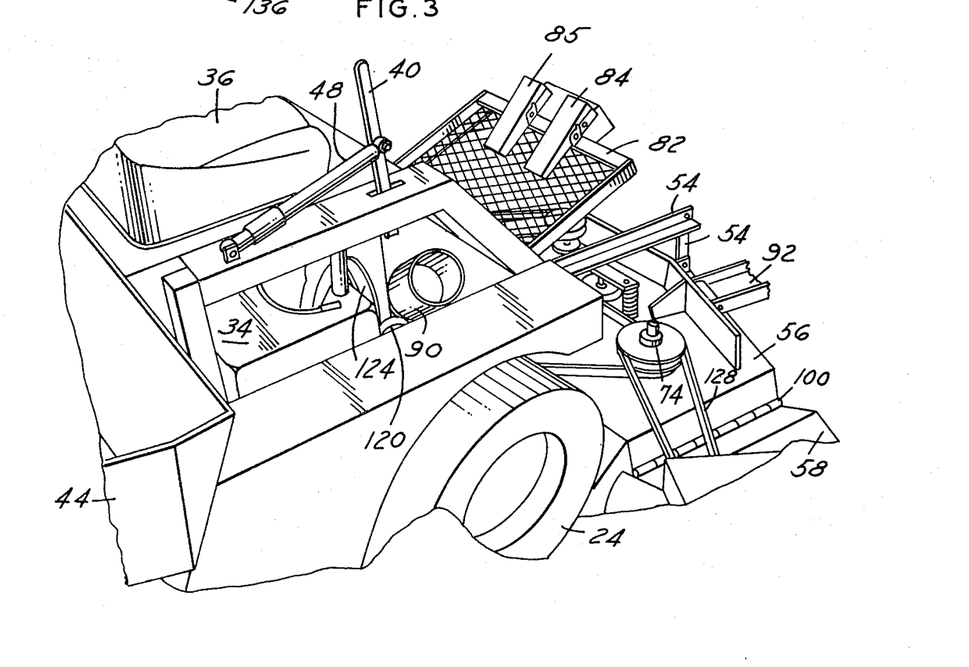
FIG. 3 is a perspective partial view of the mower.
Figure 4:
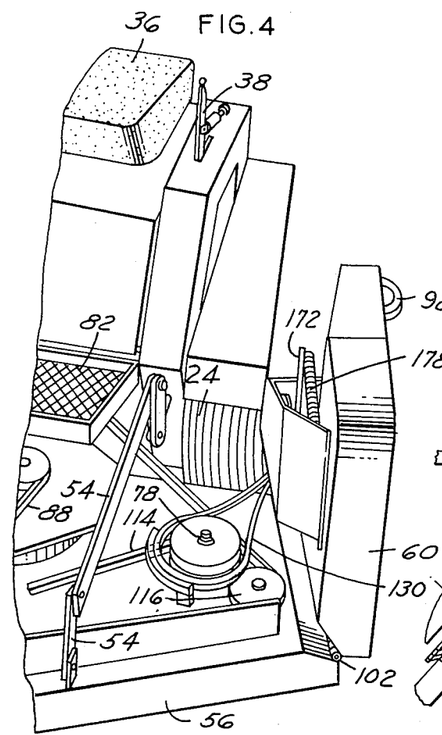
FIG. 4 is a perspective partial view of the mower with one wing fully raised.
Figure 7:
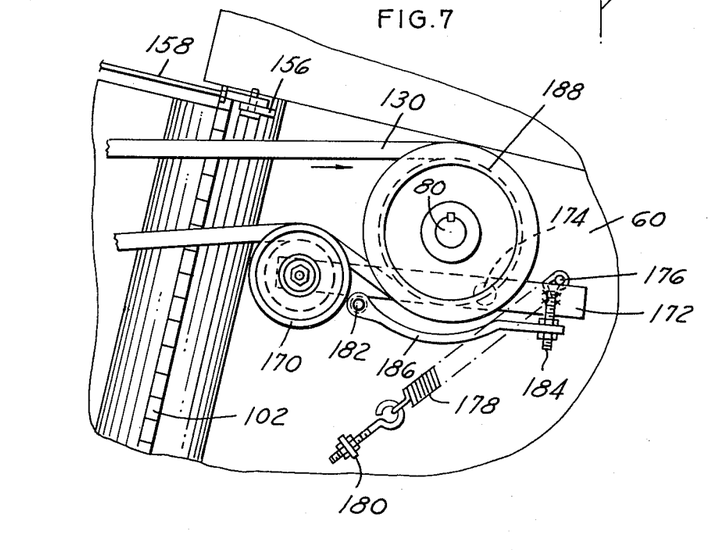
FIG. 7 is a top view detail of the wing clutch and brake mechanism.

Referring to FIGS. 3, 4 and 7 the wings 58 and 60 are attached to the central deck portion 56 by depressed hinges 100 and 102. The hinges, depressed from the top of the deck as shown, allow the wings to be tightly folded against the machine as shown in FIG. 4. More importantly, with the wing in mowing position, uneven terrain causes the wing to move upwardly and downwardly relative to the center deck 56. The mowing path swept by the wing cutter 62 or 70 overlaps the path cut by cutter 64 or 68 respectively. As the wing moves upwardly the paths tend to separate and the overlap disappears. The depressed hinge reduces the separation as the wing moves upwardly and a more even cut on rough terrain is produced.

Figure 10:
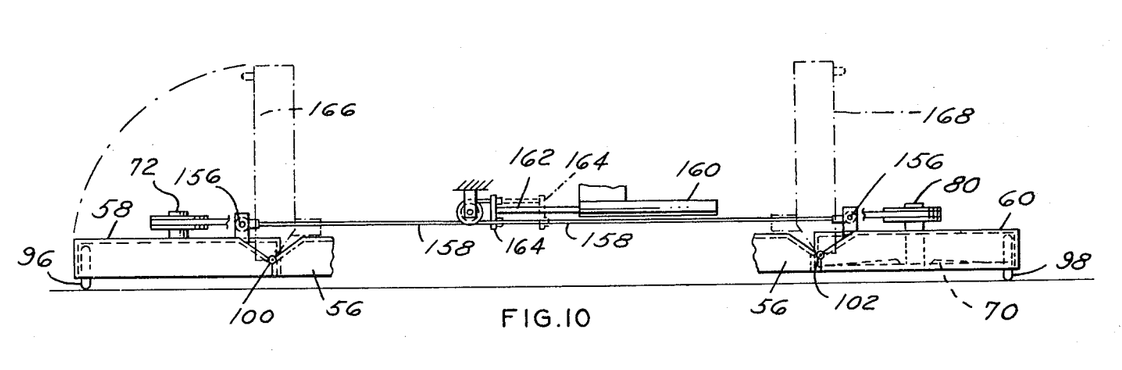
FIG. 10 is a detail of the means for raising the wings simultaneously.

The wings 58 and 60 are free to move up and down with the terrain, however, as illustrated in FIG. 10 a means is provided for the operator to raise or lower both wings simultaneously. Brackets 156 are welded to the wings 58 and 60 and connected to a dual cable linkage 158 in turn actuated by a hydraulic cylinder 160. The hydraulic cylinder 160 is controlled by the machine operator with pedal 85. Actuation of the cylinder piston rod 162 to the ghosted position 164 will raise both wings to the vertical wing positions 166 and 168 also shown ghosted. The depressed hinges 100 and 102 permit the wings 58 and 60 to be more closely folded against the tractor thereby reducing the folded width of the machine by the sum of the depth of each hinge below the deck relative to prior art machines with wing hinges located at the deck surface.

Figure 11:
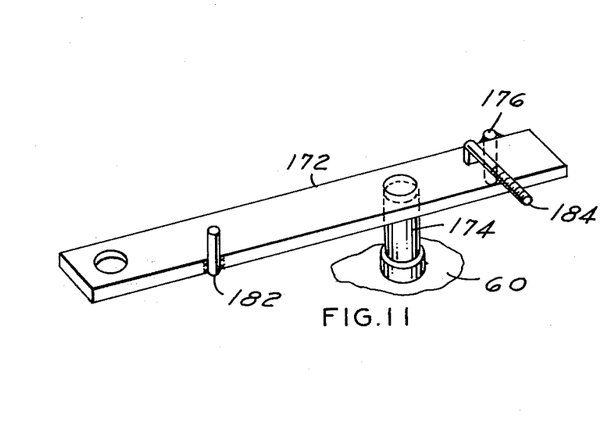
FIG. 11 is a perspective view of the support bar for the wing clutch and brake mechanism.
Figure 12:
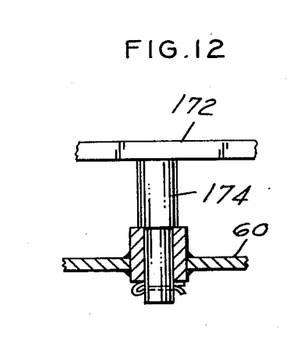
FIG. 12 is a detail of the pivot for the support bar of FIG. 11.

An important safety feature of the mower wing comprises the clutch and brake mechanism for each wing illustrated in FIGS. 4, 7 and 11. In FIG. 7 the wing 60 is shown in mowing position with the belt 130 tightly engaging and driving the spindle pulley and spindle 80. The belt 130 tension is controlled by an idler pulley 170 rotatably mounted on a bar 172 in turn mounted on a support 174. The support 174 is pivotally mounted on the wing 60 deck. The configuration of the bar and the pivotal mounting is shown in FIGS. 11 and 12. A pin 176 welded to the bar 172 engages a spring 178 in turn adjustably attached to the wing 60 deck at 180. Thus, the spring 178 biases the idler pulley 170 into engagement with the belt 130.

Upwardly extending from the bar 172 is a second pin 182 and horizontal threaded rod 184. The pin 182 and rod 184 adjustably support the brake bar 186. When the wing 60 is raised beyond the mowing range the distance between spindle 80 and spindle 78 substantially decreases. As a result the bar 172 pivots clockwise under the urging of spring 178 until brake bar 186 engages the outer flanges of the spindle 80 pulley 188, preventing further clockwise motion of the bar 172. The idler pulley 170 can no longer tightly engage belt 130 and belt 130 slacks off the pulley 188 and the pulley on spindle 78 shown in FIG. 4. The simultaneous disengagement of the belt 130 and engagement of the brake bar 186 quickly brings the wing spindle 80 and wing cutter 70 to a stop automatically as the wing is raised. The mechanism for wing 58 is a mirror image of the mechanism for wing 60 and operates in the identical manner.

Figure 13:
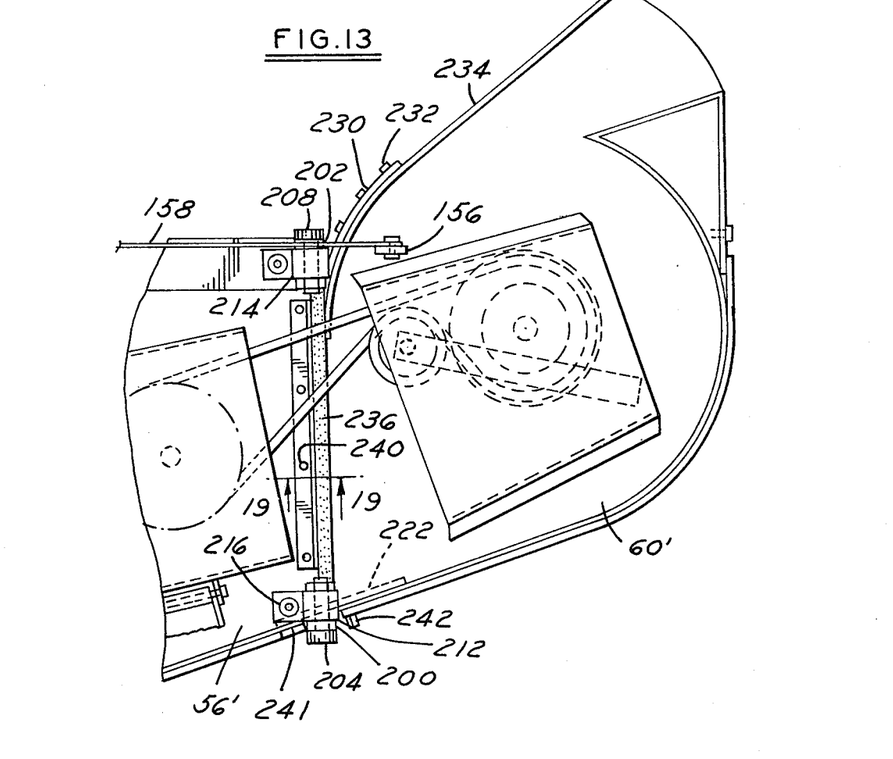
FIG. 13 is a broken away top view of an alternate form of wing.
Figure 14:
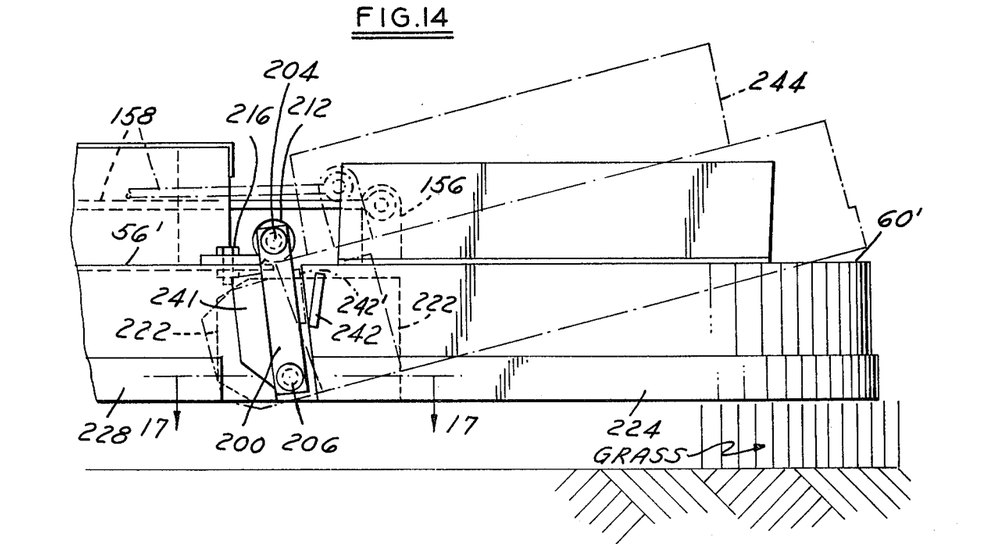
FIG. 14 is a front view of the wing of FIG. 13.
Figures 15, 16, 17, 18, 19:
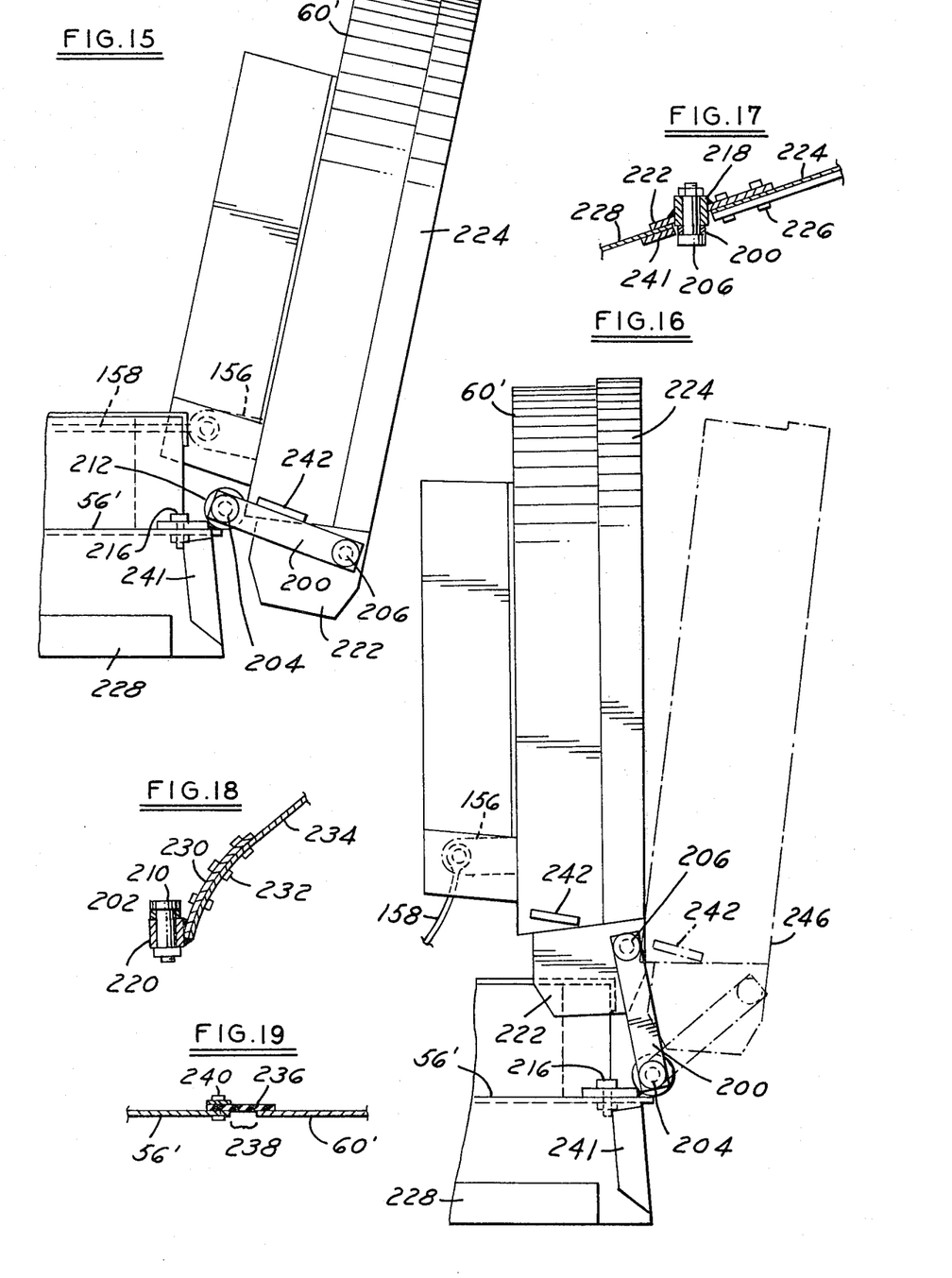
FIG. 15 is a front view of the wing of FIG. 13 in fully raised position.
FIG. 16 is a front view of the wing of FIG. 13 in a fully folded position.
FIG. 17 is a partial section of the lower forward pin taken along the line 17—17 of FIG. 14.
FIG. 18 is a partial section of the lower rearward pin.
FIG. 19 is a partial section of the deck cover taken along the line 19—19 of FIG. 13.

FIG. 13 illustrates the top view of an alternate form of the attachment of the wing 60' to the central deck portion 56'. FIGS. 14, 15 and 16 illustrate a front view of the operating, raised and folded over positions respectively for the wing 60'. The attachment comprises substantially identical forward and aft links 200 and 202 respectively. The forward link 200 includes upper and lower pivot pins or bolts 204 and 206 respectively fastened thereto. The aft link 202 includes upper and lower pivot pins or bolts 208 and 210 respectively attached thereto in a similar manner. Preferably, the bolt heads are welded to the links to permanently affix the bolts to the links. The links 200 and 202 are of equal length and the axes of the upper bolts 204 and 208 are aligned on a common axis. Similarly the axes of the lower bolts 206 and 210 are aligned on a common axis.

Mounted with bolts 216 on the central deck 56' are a pair of upper trunnion bearings 212 and 214 respectively in engagement with the upper bolts 204 and 208. Mounted on the wing deck 60' are a pair of lower trunnion bearings 218 and 220 respectively in engagement with the lower bolts 206 and 210. The lower trunnion bearing mountings are detailed in FIGS. 17 and 18.

In FIG. 17 the lower forward trunnion bearing 218 is welded to a trunnion plate 222 in turn riveted 226 to the forward skirt 224 of the wing 60'. In the lower most position the plate 222 slides behind the central deck skirt 228 as shown. In FIG. 18 the lower rearward trunnion bearing 220 is welded to a curved trunnion plate 230 in turn riveted 232 to the rearward skirt 234 of the wing 60'.

To complete the construction, FIG. 19 illustrates a rubber cover flap 236 attached to the central deck 56' by rivets 240 and substantially covering the clearance gap 238 with the wing deck 60'. The flap 236 prevents grass clippings and debri from spraying upwardly through the gap 238. Welded to the forward skirt 224 is a stop 242 engageable with the link 200. Welded to the central deck skirt 228 is a second stop 241 also engageable with the link 200.

The axes of bolts 206 and 210 are substantially at the mower blade height. Thus, the alternative linkage attachment permits the lower hinge point of the wing deck 60' to be substantially at the same elevation above the ground as the mower blades further reducing the separation of the mower blade paths as the wing deck 60' rotates up and down. A more even cut is thereby produced. In normal mowing operation the wing deck 60' swivels upwardly as much as 15° about the axes of the lower bolts 206 and 210 as well as downwardly. The link 200 remains against the stop 241.

At an elevation of 15° as indicated by the ghosted outline 244 in FIG. 14, the stop 242 engages the link 200 as shown at 242' preventing further rotation of the wing deck 60' about the lower bolts 206 and 210. Further upward movement is normally actuated by the cable 158 and attachment bracket 156 as above. Because of the engagement of the stop 242 with the link 200 the wing deck 60' and links 200 and 202 are forced to rotate about the upper trunnion bearings 212 and 214. Thus, by cable 158 actuation the wing deck 60' can be raised to the position substantially as shown in FIG. 15.

The wing deck 60' can be further raised above the central deck 56' and folded thereover against the tractor portion of the mower. The wing deck 60' is raised manually from the position shown in FIG. 15 to the position shown ghosted at 246 in FIG. 16 disengaging the stop 242 from the link 200. Further manual rotation permits the wing deck 60' to be placed over and rested upon the central deck 56' as shown in solid outline in FIG. 16. Thus, the overall width of the mower can be reduced to substantially the width of the central deck 56' width with both wing decks folded thereover in the alternative embodiment.

I claim:

1. An improved mower deck for attachment to a tractor comprising a central deck, at least one wing deck attached to the central deck, a plurality of vertically mounted blade spindles in the mower deck each rotatably supporting a cutting blade, at least one of said spindles being in the wing deck, a pair of links attaching the wing deck to the central deck, one end of each link being pivotably attached to the central deck and the other end of each link being pivotably attached to the wing deck, stop means to limit upward angular rotation of the wing deck about the pivotal attachments to the wing deck, said stop means located substantially below the axis of the pivotal attachments to the central deck, said stop means disengageable upon movement of the wing deck above and over the central deck.

2. The mower deck of claim 1 wherein the pivotal attachment to the wing deck is at substantially the same elevation as the cutting blades.

3. The mower deck of claim 1 wherein the upward angular rotation of the wing deck about the pivotal attachments thereto is limited to substantially 15° from the plane of the central deck cutting blades.

4. The mower deck of claim 1 wherein the stop means engages at least one of the links thereby causing upward angular rotation of the wing deck to be about the pivotal attachments to the central deck.

5. The mower deck of claim 4 wherein the wing deck may be manually raised vertically to disengage the stop means from the link thereby permitting rotation of the wing deck relative to the link and rotation of the link substantially above the central deck for placement of the wing deck above the central deck.

6. The mower deck of claim 1 wherein the pivotal attachments to the central deck are positioned substantially above the pivotal attachments to the wing deck when the wing deck is in the mowing position.

7. The mower deck of claim 1 including separate stop means on the central deck engageable with at least one link to prevent rotation of the link about the pivotal attachment to the central deck upon downward angular rotation of the wing deck from the plane of the central deck cutting blades.

8. An improved mower deck for attachment to a tractor comprising a central deck, at least one wing deck attached to the central deck, a plurality of vertically mounted blade spindles in the mower deck, each rotatably supporting a cutting blade, at least one of said spindles being in the wing deck, a pair of links attaching the wing deck to the central deck, one end of each link being pivotably attached to the central deck and the other end of each link being pivotably attached to the wing deck, stop means to limit upward angular rotation of the wing deck about the pivotal attachments to the wing deck, said stop means located substantially below the axis of the pivotal attachments to the central deck and adapted to engage at least one link depending from the central deck upon sufficient upward angular movement of the wing deck, and, said stop means disengageable from said link upon movement of said wing deck substantially above the central deck to permit rotation of the wing deck relative to the link and rotation of the link substantially above the central deck for placement of the wing deck above the central deck.

9. The mower deck of claim 8 wherein the pivotal attachment to the wing deck is at substantially the same elevation as the cutting blades.

10. The mower deck of claim 8 wherein the upward angular rotation of the wing deck about the pivotal attachments thereto is limited to substantially 15° from the plane of the central deck cutting blades.

11. The mower deck of claim 8 wherein the engagement of the stop means with one of the links causes the upward angular rotation of the wing deck to be about the pivotal attachments to the central deck.

12. The mower deck of claim 8 wherein the wing deck may be manually raised vertically to disengage the stop means from the link to thereby permit placement of the wing deck above the central deck.

13. The mower deck of claim 8 wherein the pivotal attachments to the central deck are positioned substantially above the pivotal attachments to the wing deck when the wing deck is in the mowing position.

14. The mower deck of claim 8 including separate stop means on the central deck engageable with at least one link to prevent rotation of the link about the pivotal attachment to the central deck upon downward angular rotation of the wing deck from the plane of the central deck cutting blades.

* * * * *

UNITED STATES PATENT AND TRADEMARK OFFICE
CERTIFICATE OF CORRECTION

PATENT NO. : 4,429,515

DATED : February 7, 1984

INVENTOR(S) : Robert D. Davis, Jr. and James S. Schucker

It is certified that error appears in the above-identified patent and that said Letters Patent are hereby corrected as shown below:

Col. 5, line 25: Delete "operateleaves" and substitute therefor --operator leaves--.

Signed and Sealed this

First Day of May 1984

[SEAL]

Attest:

GERALD J. MOSSINGHOFF

Attesting Officer

Commissioner of Patents and Trademarks